United States Patent
Kawabata et al.

(10) Patent No.: US 6,479,956 B1
(45) Date of Patent: Nov. 12, 2002

(54) BRUSHLESS MOTOR CONTROL DEVICE AND EQUIPMENT USING THE CONTROL DEVICE

(75) Inventors: Yukio Kawabata, Hitachinaka (JP); Yasuo Notohara, Hitachiota (JP); Kazuo Tahara, Hitachi (JP); Yuhachi Takakura, Oyama (JP); Makoto Ishii, Utsunomiya (JP); Hiroshi Shinozaki, Ohira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/743,697

(22) PCT Filed: Jul. 6, 1999

(86) PCT No.: PCT/JP99/03658

§ 371 (c)(1),
(2), (4) Date: Jan. 16, 2001

(87) PCT Pub. No.: WO00/04630

PCT Pub. Date: Jan. 27, 2000

(30) Foreign Application Priority Data

Jul. 15, 1998 (JP) ............................................ 10-200079

(51) Int. Cl.$^7$ .............................................. H02K 23/00
(52) U.S. Cl. ...................... 318/254; 318/138; 318/439; 318/608
(58) Field of Search ................................ 381/254, 138, 381/439, 608, 701, 720–724, 432, 433

(56) References Cited

U.S. PATENT DOCUMENTS 5,463,299 A    10/1995   Futami et al.
5,886,486 A *  3/1999    Jeong et al. ................. 318/254
6,078,161 A *  6/2000    Kim et al. .................... 318/254
6,121,736 A *  9/2000    Narazaki et al. ............. 318/254

FOREIGN PATENT DOCUMENTS

| JP | 63154093  | * | 6/1988  |
| JP | 3285591   | * | 12/1991 |
| JP | 4334994   | * | 11/1992 |
| JP | 5236787   | * | 9/1993  |
| JP | 6-284783  |   | 7/1994  |
| JP | 7135794   | * | 5/1995  |

* cited by examiner

*Primary Examiner*—Khanh Dang
(74) *Attorney, Agent, or Firm*—Antonelli, Terry, Stout & Kraus, LLP

(57) ABSTRACT

The present invention supplies a position detection circuit, and a motor controller, that can not only obtain rotor position detection signals properly over the entire PWM control region, but also obtain these signals properly during PAM control. In a brushless motor controller based on the present invention to detect the magnetic pole position of the stator in the motor in accordance with the stator coil terminal voltages of multiple phases and control the energization of the stator coils, the comparison result information signal, after being obtained through comparison between the detected voltage values corresponding to the foregoing terminal voltages, and a reference voltage value, is directly entered into control circuits, then the position of the rotor in the motor is properly detected immediately after power-on switching, without a rotor position detection inhibition time interval being provided, and the motor is controlled properly.

27 Claims, 7 Drawing Sheets

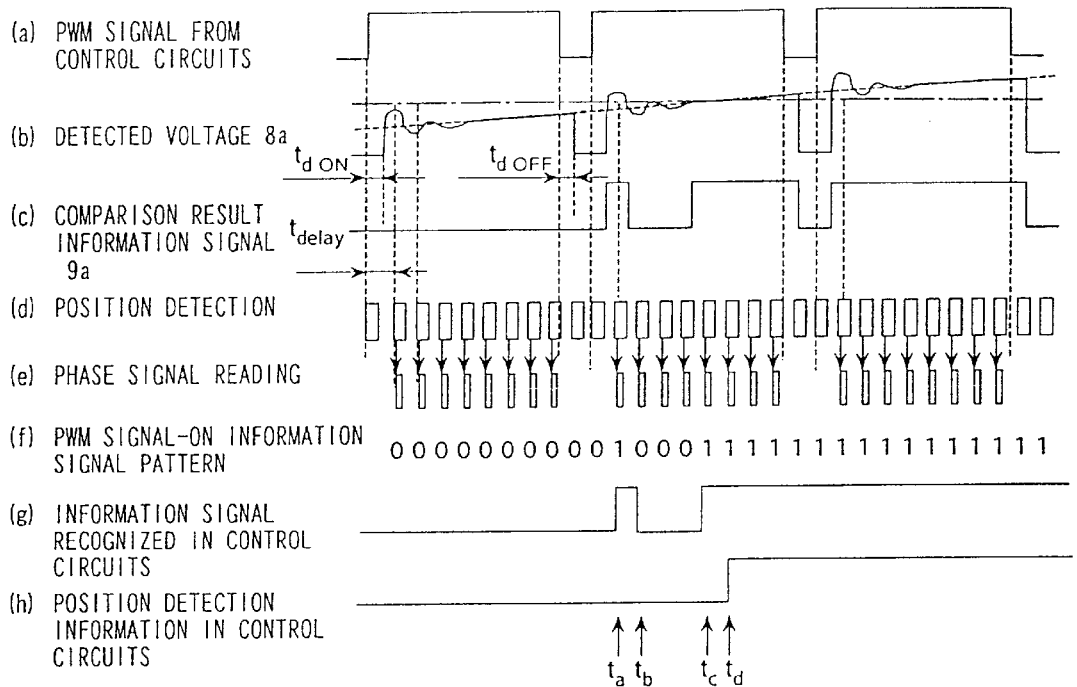
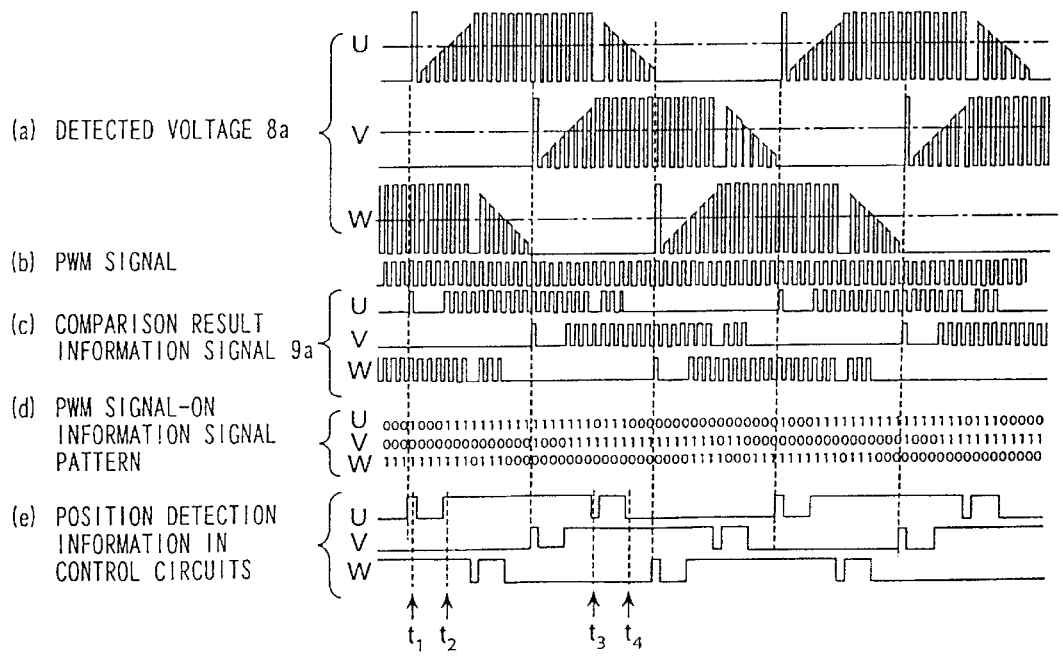

(a) DETECTED VOLTAGE 8a (b) PWM SIGNAL (c) COMPARISON RESULT INFORMATION SIGNAL 9a (d) POSITION DETECTION INFORMATION IN CONTROL CIRCUITS $t_{sdelay}$ (a) DETECTED VOLTAGE 8a (b) PWM SIGNAL (c) COMPARISON RESULT INFORMATION SIGNAL 9a (d) PWM SIGNAL-ON INFORMATION SIGNAL PATTERN (e) POSITION DETECTION INFORMATION IN CONTROL CIRCUITS $t_1$ $t_2$ $t_3$ $t_4$

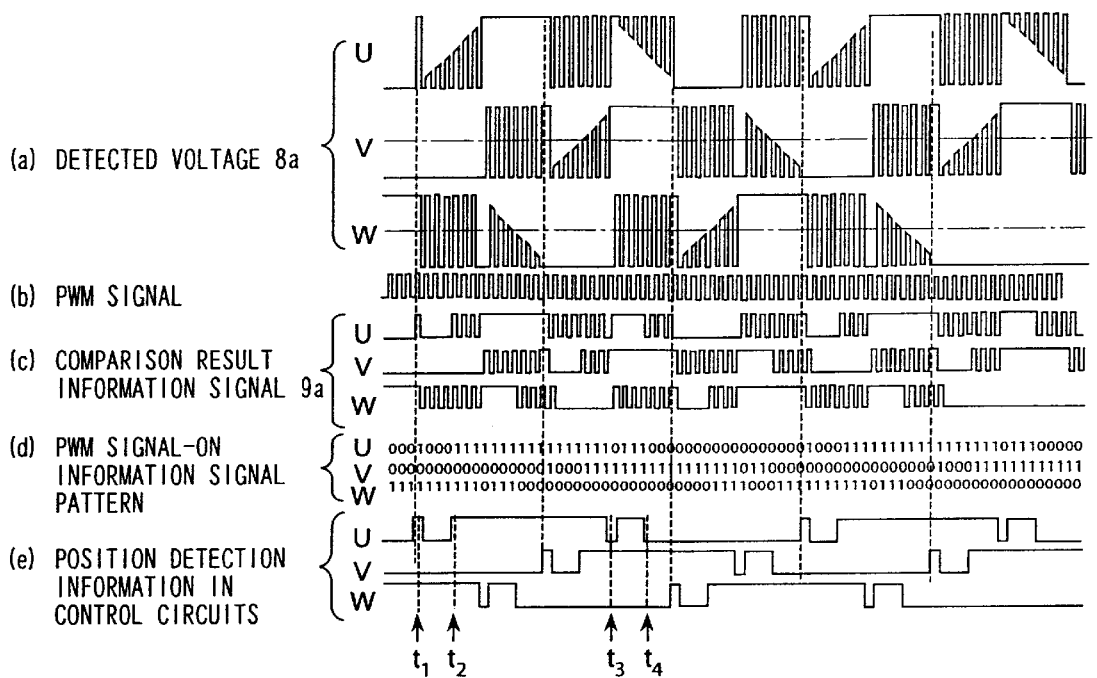
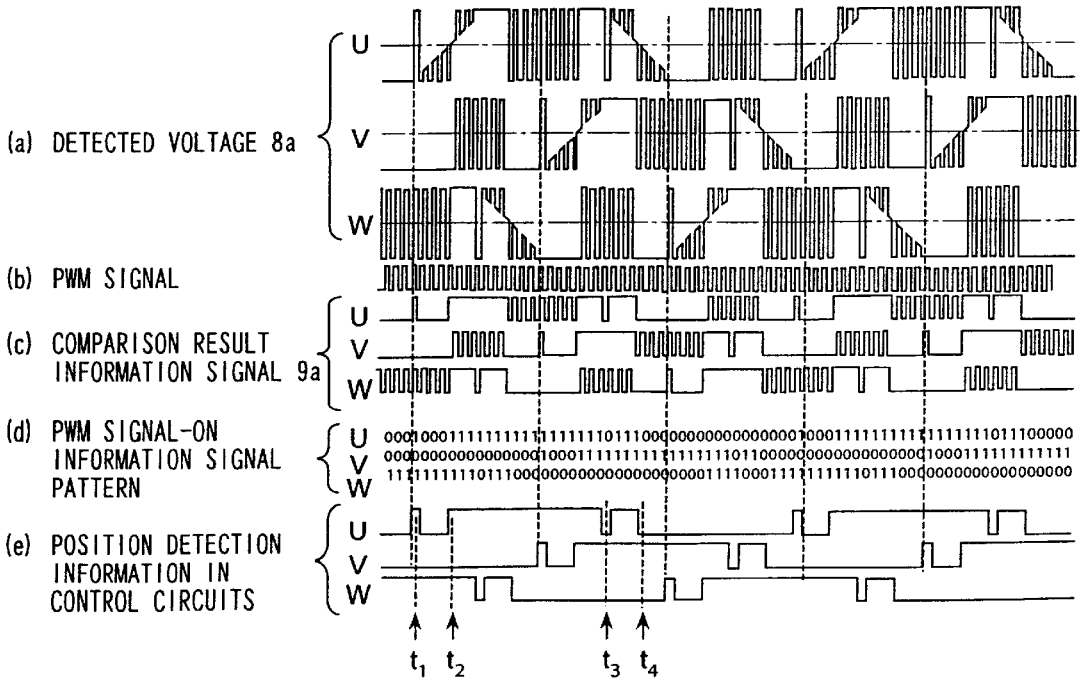

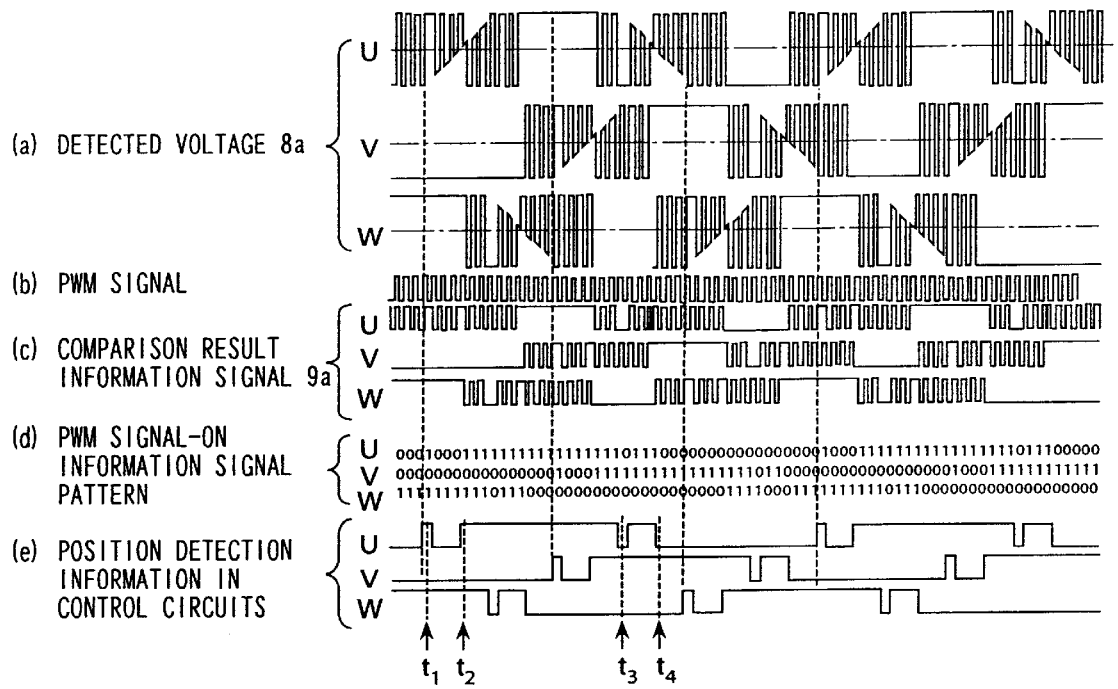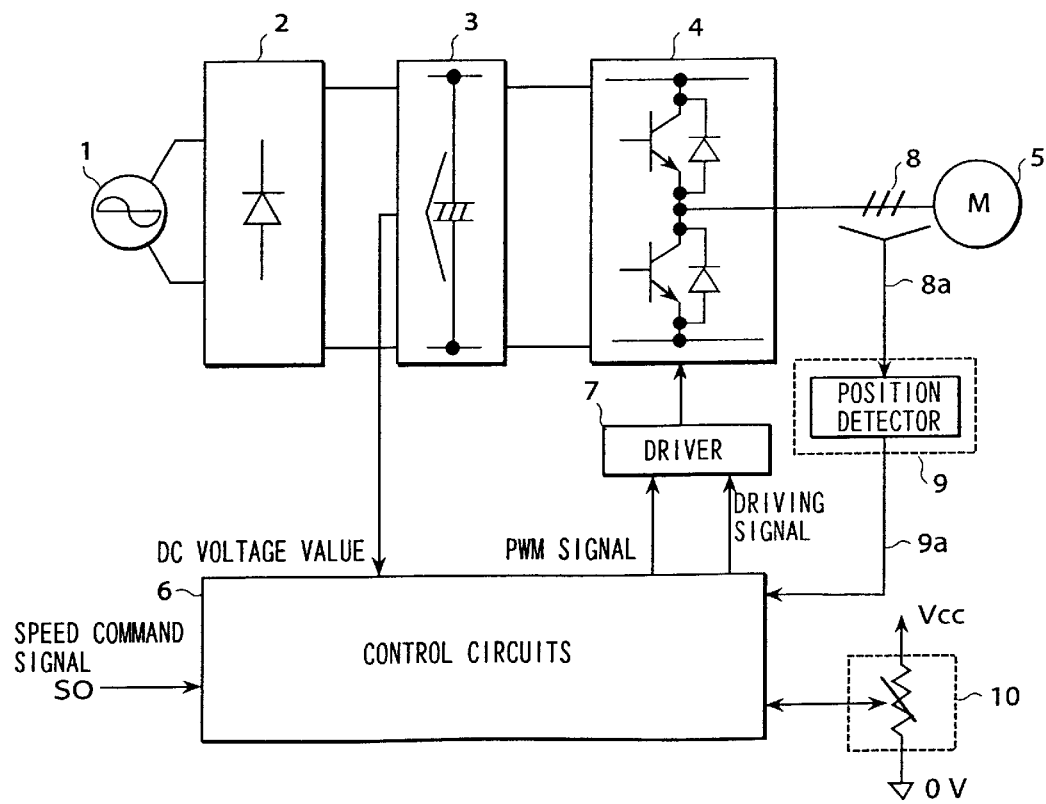

BRUSHLESS MOTOR CONTROL DEVICE AND EQUIPMENT USING THE CONTROL DEVICE

BACKGROUND OF THE INVENTION

The present invention relates to a controller that controls the rotational speed of a brushless motor to achieve a desired motor speed; and, more particularly, the invention relates to an air conditioner that conditions interior air by controlling the brushless motor driving its internal compressor/blower using this controller, to a refrigerator that provides refrigeration by controlling the brushless motor during its internal compressor/blower using the controller, to a washing machine that washes clothes by controlling the brushless motor during its pulsator or spin-basket using the controller, and to a vacuum cleaner that cleans rooms by controlling the brushless motor driving its blower using the controller.

Because of their easy maintenance, brushless motors, which include a combination of a permanent magnet rotor and stator coils, are used in air conditioners, refrigerators, washing machines, and the like.

Brushless motor driving control requires close linking between the magnetic pole position of the rotor and the positions of the stator coils. A sensorless position detection scheme utilizing the counter-electromotive force induced into the stator coils by their interactions with the magnetic pole of the rotor is employed to detect the magnetic pole position of the rotor; it is not detected using a rotor position detection sensor, such as a Hall element.

Brushless motor drives using the sensorless position detection scheme include those set forth in, for example, Japanese Application Patent Laid-Open Publication No. Hei-6-284783 and Hei-6-98583. For these brushless motor drives, which are so designed as to detect the crossing point (namely, the rising or falling edge) between the terminal voltages of the motor and a reference voltage, the required electrical angle (for example, 15 degrees) is calculated in one way or another immediately after commutation so that a spike voltage signal will not be detected as a rotor position detection signal, and the time corresponding to this electrical angle is set as a position detection inhibition interval. During this inhibition interval, signal detection is inhibited, and signals are acquired only after the elapse of the inhibition time. Or, the crossing point (namely, the rising or falling edge) with respect to the reference voltage is detected by modifying the pattern of chopping by only the upper and lower switching devices among all six switching devices, and motor control is based on the detection position.

For conventional brushless motor drives, since the required electrical angle must be calculated in one way or another immediately after commutation, the use of a microcomputer or the like to calculate this angle increases the processing time required, or the use of an external circuit to perform the calculation requires a complex circuit composition.

In the case of these conventional brushless motor drives, although mis-judgment based on the spike voltage developed during the inhibition interval can be prevented by providing the inhibition interval, if an abrupt load change causes output of a rotor position detection signal during the inhibition interval immediately after commutation, this signal cannot be detected. For this reason, there arises a problem in that, since a position significantly offset from the actual position of the rotor is likely to be mis-judged as the actual rotor position, the operation becomes unstable or the motor decreases in operational efficiency or steps out.

An object of the present invention is to provide a brushless motor controller that can properly detect the position of a rotor immediately after commutation, without being provided with a position detection inhibition interval immediately after commutation.

Another object of the present invention is to provide a low-cost and simplified brushless motor controller that is high in rotor magnetic pole position detection accuracy and is capable of accurately controlling the corresponding brushless motor as well.

Still another object of the present invention is to provide a motor controller that can properly control a brushless motor without stopping it, even during a very long interval of flow of a reflux current after power-on switching.

A further object of the present invention is to minimize position detection errors due to noise.

A further object of the present invention is to provide a brushless motor controller that can minimize the occurrence of a power-on malfunction due to noise.

A further object of the present invention is to provide a brushless motor controller that can automatically attach importance to more efficient or faster operation during brushless motor operational control.

A further object of the present invention is to provide a brushless motor controller that covers a larger control range.

A further object of the present invention is to provide appliances, especially an air conditioner, a refrigerator, a washing machine, and a vacuum cleaner, that are powered from the brushless motor thus controlled.

SUMMARY OF THE INVENTION

A feature of the present invention for achieving the objects described above is characterized in the fact that a first information signal pattern is stored into an information signal pattern storage means; and, when the first information signal pattern and a third information signal pattern are the same and a second information signal pattern is different from the other two patterns, a reflux current decay signal is generated by an information signal pattern comparison means.

According to this feature, when the first information signal pattern and the third information signal pattern are the same and the second information signal pattern is different from the other two patterns, since a reflux current is generated immediately after commutation and is then decayed, the information signal pattern comparison means compares the first information signal pattern, the second information signal pattern, and the third information signal pattern, and generates a reflux current decay signal. Thus, the loss of the reflux current can be detected. As a result, the position of the rotor can be properly detected immediately after commutation, without providing a rotor position detection inhibition interval, by detecting the loss of the reflux current and then detecting the rotating position of the rotor in accordance with the information signal patterns created by the corresponding information signal generation means. Even if the load changes abruptly, the corresponding brushless motor can also be driven with rapid response, since no inhibition time interval needs to be calculated.

In addition, since rotor position detection is possible without the chopping pattern of any switching device, the position of the rotor can be detected properly, even if the upper or lower three of six switching devices low operating speed devices and are inexpensive.

Another feature of the present invention resides in the fact that the first information signal pattern that has been stored into the above-mentioned information signal pattern storage means is changed to the second information signal pattern by an information signal pattern changing means using a reflux signal decay signal.

According to this feature, when the first information signal pattern and the third information signal pattern are the same, and the second information signal pattern is different from the other two patterns, since a reflux current is generated immediately after commutation and is then decayed, and since the second information signal pattern is an information signal pattern corresponding to the rotor position to be detected, the position of the rotor can be properly detected immediately after commutation, without providing a rotor position detection inhibition interval, by detecting from all information signal patterns generated by the information signal generation means, only the information signal pattern matching the second information signal pattern stored within the information signal pattern storage means, and then detecting the rotating position of the rotor in accordance with that detected information signal pattern.

Still another feature of the present invention resides in the fact that, when the fourth information signal pattern matches either of the information signal patterns stored within the information signal pattern storage means, an information signal pattern match signal is generated by the information signal pattern comparison means and the rotating position of the rotor is detected by a rotating position detection means using the information signal pattern match signal.

According to this feature, when detection of the loss of the reflux current is followed by matching between the fourth information signal pattern and either of the information signal patterns stored within the information signal pattern storage means, since the fourth information signal pattern is an information signal pattern corresponding to the rotor position to be detected, the information signal pattern comparison means compares the fourth information signal pattern and all other information signal patterns stored within the information signal pattern storage means and generates an information signal pattern match signal. Thereby, the rotating position detection means can properly detect the position of the rotor immediately after commutation, without providing a rotor position detection inhibition interval, by detecting the rotating position of the rotor in accordance with the information signal pattern match signal and the corresponding information signal pattern generated by the information signal generation means.

Still another feature of the present invention resides in the fact that, when the required time has elapsed from commutation, the first information signal pattern that was stored into the information signal pattern storage means is changed to the second information signal pattern by the information signal pattern changing means.

According to this feature, even if the reflux current interval that follows power-on switching is too long for the loss of the reflux current to be detected, the magnetic pole position of the rotor can be detected and the motor can be properly controlled at a low cost.

A feature of the present invention is characterized in the fact that, for a brushless motor controller that detects the magnetic pole position of the stator from the terminal voltages of the stator coils of each phase and controls the energization (power-on) of these stator coils, the position of the rotor can be detected immediately after commutation, by entering directly into the control circuits of the controller a comparison result information signal, which is obtained through comparison between the detected voltages corresponding to the above-mentioned terminal voltages, and a reference voltage.

Another feature of the present invention is characterized in the fact that the position of the rotor can be detected without using the chopping pattern of any switching device.

Still another feature of the present invention is characterized in the fact that the comparison result information signal, which is obtained through comparison between the detected voltages, corresponding to the above-mentioned terminal voltages, and a reference voltage, is directly entered into the control circuits, the PWM signal on/off interval is judged in the control circuits, and the delay time for both the PWM signal received from the control circuits and the PWM signal applied to the motor can be set using either an updatable EEPROM, a variable resistor, or the like.

A further feature of the present invention is characterized in the fact that the position of the rotor is detected from the comparison result information signal pattern corresponding to the terminal voltages of the stator coils of multiple phases.

A further feature of the present invention is characterized in the fact that the power-on pattern for the stator coils is determined from the comparison result information signal pattern corresponding to the terminal voltages of the stator coils of multiple phases.

A further feature of the present invention is characterized in the fact that the interval during which a reflux current flows following power-on switching is detected from the comparison result information signal pattern corresponding to the terminal voltages of the stator coils of multiple phases.

A further feature of the present invention is characterized in the fact that the phase signal pattern to be checked for position detection is updated after the reflux current developed through power-on-switching has been lost.

A further feature of the present invention is characterized in the fact that when the required time elapses from power-on switching, even if the reflux current interval is very long, the next power-on switching can be executed by updating forcibly the signal pattern checked.

A further feature of the present invention is characterized, in the fact that power-on phase selection is based on either comparison result information, the received phase control command from an external circuit, the contents of the EEPROM, the rotational speed of the motor, or the calculated electrical quantity corresponding to the amount of current flowing into the inverter or motor.

A further feature of the present invention is characterized in the fact that, in a PWM control region, importance is attached to operational efficiency during phase control, and in a high-speed rotation control region, control is provided to advance the power-on phase.

A further feature of the present invention is characterized in the fact that, even if the three upper or lower of all six switching devices are low in operating speed and inexpensive, the position of the rotor can be detected properly.

A further feature of the present invention is characterized in the fact that a simple position detection software configuration can be included in the control circuits.

A further feature of the present invention is characterized in the fact that the size of the data table within the internal position detection software of the control circuits and the occupancy of a RAM or ROM can be minimized.

And, a further feature of the present invention is characterized in the fact that the brushless motor controlled by such controller as described above can be used as the power supply for an air conditioner, a refrigerator, a washing machine, or a vacuum cleaner.

BRIEF DESCRIPTION OF THE DRAWINGS

FIG. 3 is a diagram showing the signal waveforms developed when the terminal voltages fluctuate near the reference position in embodiment 1.

FIG. 5 is a diagram showing the signal waveforms developed at a PWM control current conduction ratio of 100% when upper arm chopping is executed in the inverter circuit of embodiment 1.

FIG. 8 is a diagram showing the signal waveforms developed when PWM control is performed with the upper, lower, and second-half 60-degree arm choppers combined in the inverter circuit of embodiment 1.

FIG. 9 is a diagram showing the signal waveforms developed when PWM control is performed with the upper, lower, and second-half 30-degree arm choppers combined in the inverter circuit of embodiment 1.

FIG. 10 is a diagram showing the signal waveforms developed when PWM control is performed with the upper, lower, and first-half 30-degree arm choppers combined in the inverter circuit of embodiment 1.

FIG. 13 is a block diagram of the brushless motor controller according to embodiment 2 of the present invention.

DETAILED DESCRIPTION OF THE INVENTION

Figure 1:
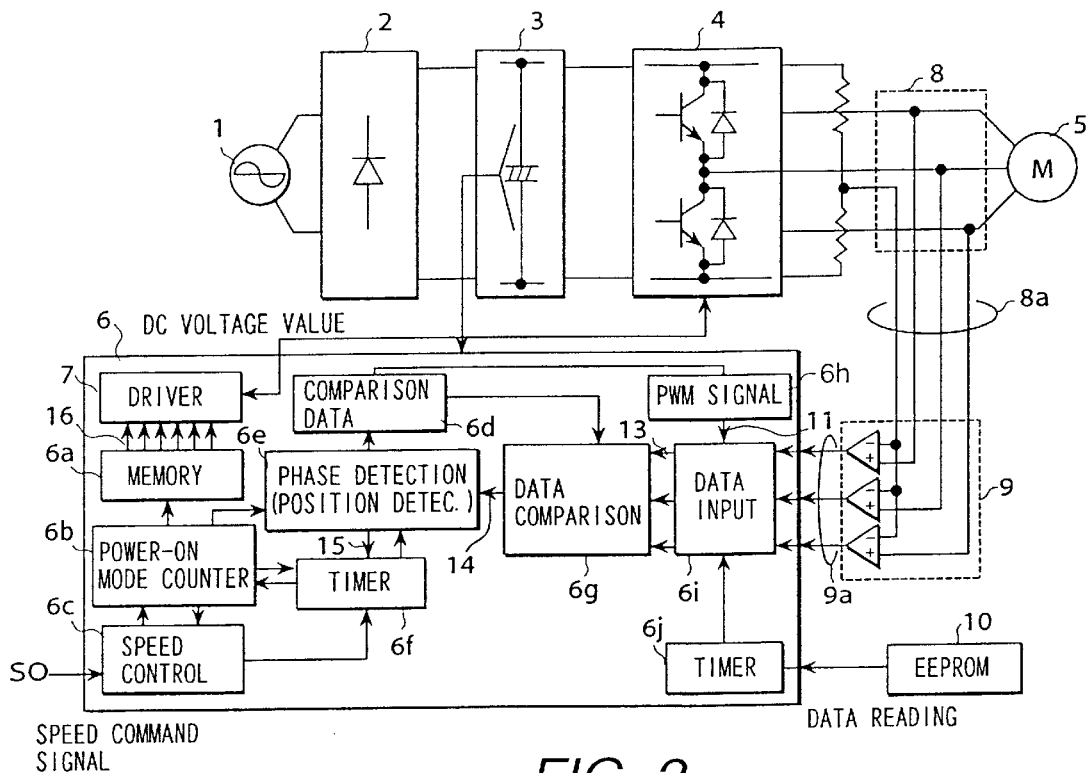
FIG. 1 is a block diagram of a brushless motor controller according to embodiment 1 of the present invention.

The brushless motor controller representing embodiment 1 of the present invention will be described below. A block diagram of this brushless motor controller is shown as FIG. 1.

The brushless motor controller in embodiment 1 comprises a rectifying circuit 2 for rectifying the AC voltage supplied from AC power supply 1; a smoothing circuit 3 for smoothing the rectifier output voltage of rectifying circuit 2; an inverter circuit 4 for converting the output DC voltage of smoothing circuit 3 into an AC voltage of any pulse width and supplying this AC voltage to the stator coils of brushless motor 5; a terminal voltage detector 8 for sending to the next stage the detected voltage "8a" corresponding to the terminal voltages (=counter-electromotive force) of each phase of the stator coils in brushless motor 5; a phase signal generation circuit 9 for generating a phase signal "9a" representing the magnetic pole position information of the rotor in brushless motor 5 in accordance with detected voltage "8a" mentioned above; EEPROM 10, which contains PWM signal delay time data; and control circuits 6 for controlling the driving of brushless motor 5 in accordance with the data that has been stored into the EEPROM 10, the speed command signal SO, and the phase signal "9a" created by phase signal generation circuit 9.

Control circuits 6 can be a single-chip microcomputer or a hybrid IC.

Phase signal generation circuit 9 compares detected voltage "8a" and a reference voltage and then generates a phase signal "9a" for each phase. The reference voltage value is half of either the neutral point voltage value of the stator coils in the brushless motor 5 or the output DC voltage value of the smoothing circuit 3. Even if the characteristics of the power module differ, since the internal constants of software require no modification, versatility can be assigned to the control software by designing the controller so that delay time information can be adjusted using the updatable EEPROM 10, an external resistor, or the like.

Next, control circuits 6 will be described in detail below.

Control circuits 6 have a timer "6j" for sending an ON signal after the elapse of a delay time equivalent to "td" specified in EEPROM 10; a PWM signal generation unit "6h" for generating PWM signal 11; a data input unit "6i" for reading the PWM signal 11, the delay time "td" ON signal, and the phase signal "9a" sent from phase signal generation circuit 9, and then sending digital information signal patterns 13; a comparison data storage unit "6d" for storing the information signal patterns that have been read in the past; a data comparing unit "6g" for comparing newly read information signal patterns 13 and the information signal patterns that have been read in the past, and then sending comparison results 14; a phase detection unit "6e" for detecting the phase in accordance with the comparison results 14 received from data comparing unit "6g", and then sending phase detection information 15; a speed control unit "6c" for generating power-on pattern 16 based on phase detection information 15 and speed command signal SO; a timer "6f" for counting how often signal processing has been repeated during the required electrical angle interval (for example, an electrical angle interval of 30 degrees, an electrical angle interval of 60 degrees, an electrical angle interval of 120 degrees, or an electrical angle interval of 360 degrees, or a mechanical angle interval of 360 degrees); a power-on mode counter "6b" for counting power-on mode sessions based on power-on pattern 16 and on the signal processing count output value of timer "6f"; a memory "6a" for storing power-on pattern 16 and the power-on mode session count value and for supplying power-on pattern 16 to the next stage; and a driver 7 for receiving stored power-on pattern 16 from memory "6a" and controlling the switching operation of inverter circuit 4 according to the particular power-on pattern.

Figure 2:
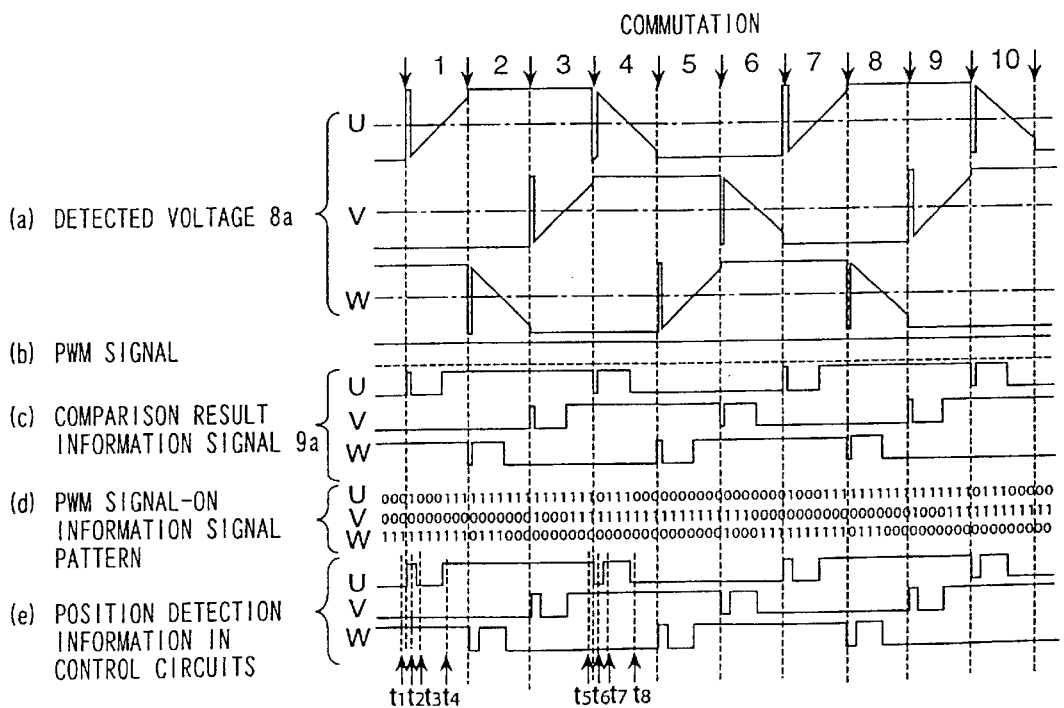
FIG. 2 is a diagram showing the signal waveforms developed at a PWM control current conduction ratio of 100% in embodiment 1.

In this embodiment, internal processing by control circuits 6 takes place to control the driving of brushless motor 5 at a PWM control current conduction ratio of 100%, as shown in FIG. 2. The signals shown in FIG. 2 will be described first, and then the internal processing by the control circuits 6 will be described.

The signals shown in FIG. 2 are (a) detected terminal voltage signals "8a" of phases U, V, and W of the stator coils in brushless motor 5, (b) PWM signal 11 generated by PWM signal generation unit "6h", (c) phase signals "9a" sent from phase signal generation circuit 9 for each phase, (d) information signal patterns 13 sent from data input unit "6i", and (e) phase detection information 15 sent from phase detection unit "6e".

The upward arrows in FIG. 2 represent the timing in which data input unit "6i" reads phase signals "9a", and part of the timing is shown as "t1" to "t8".

As shown in FIG. 2, when commutation ① is immediately followed by the occurrence of a spike-like voltage 21 at the phase U corresponding to detected voltage "8a", this voltage is incorporated into phase signals "9a", information signal patterns 13, and phase detection information 15. Immediately before commutation ①, the levels of phase signals "9a" were Low, Low, and High (shown for phases U, V, and W, in that order). Likewise, information signal patterns 13 were [0, 0, 1], and phase detection information 15 was Low, Low, and High. Once spike-like voltage 21 has occurred, however, the levels of phase signals "9a" change to High, Low, and High, information signal patterns 13 change to [1, 0, 1], and-phase detection information 15 changes to High, Low, and High.

After that, spike-like voltage 21 disappears from the phase U corresponding to detected voltage "8a", and phase signals "9a" take the same levels (Low, Low, and High) as the signal levels existing immediately before commutation d). When time further passes, the signal levels of phase signals "9a" change once again to High, Low, and High, at the crossing point of the reference voltage and detected voltage "8a". Information signal patterns 13 sent from data input unit "6i" to data comparing unit "6g" change to [0, 0, 1] at "t1", [1, 0, 1] at "t2", [0, 0, 1] at "t3", and [1, 0, 1] at "t4".

At this time, the U-, V-, and W-phase signal patterns corresponding to the comparison result information signal "9a" at "t3" are the signal patterns existing immediately before commutation ①, and at the same time, this indicates that the reflux current has been lost as in "t2". Data comparing unit "6g" compares information signal patterns 13 sent from data input unit "6i", and the past information signal patterns stored within comparison data storage unit "6d". Data comparing unit "6g" compares the information signal patterns 13 obtained at "t1", "t2", and "t3". After the information signal pattern 13 at "t3" has been found to match the signal pattern obtained at "t1" immediately before commutation ①, data comparing unit "6g" judges that the reflux current at "t2" has been lost, and then sends comparison results 14. In accordance with the comparison results 14 that have been received from data comparing unit "6g", phase detection unit "6e" judges that the information signal pattern 13 at "t3" is the signal pattern corresponding to the next phase to be detected, and changes the appropriate information signal pattern within comparison data storage unit "6d" to the information signal pattern 13 existing at "t3".

For "t4", data comparing unit "6g" compares the information signal pattern 13 existing at "t4" and the information signal pattern of "t2", stored within comparison data storage unit "6d". When both signal patterns match, data comparing unit "6g" sends comparison results 14. In accordance with the comparison results 14 that have been received from data comparing unit "6g", phase detection unit "6e" sends to speed control unit "6c" the phase detection information 15 corresponding to the information signal pattern 13 at "t4".

After receiving phase detection information 15 from phase detection unit "6e", speed control unit "6c" derives power-on pattern 16 with respect to the stator coils and sends this pattern to driver 7.

Driver 7, after receiving power-on pattern 16 from speed control unit "6c", drives inverter circuit 4.

As described above, this embodiment enables the position of the rotor to be properly detected without providing a rotor position detection inhibition time interval.

Also, although the time corresponding to the particular electrical angle changes with the rotational speed of the motor, which makes it necessary in the prior art to calculate the time corresponding to the electrical angle each time the motor speed changes, no inhibition time interval needs to be calculated in this embodiment. In addition, even if the load changes abruptly, since information signal patterns are created from comparison results on the stator coil terminal voltages and a reference voltage and then, before the rotor position corresponding to the information signal pattern is detected, the phase to be detected is confirmed through comparison with the past information signal patterns, the position of the rotor can be detected properly.

Figure 4:
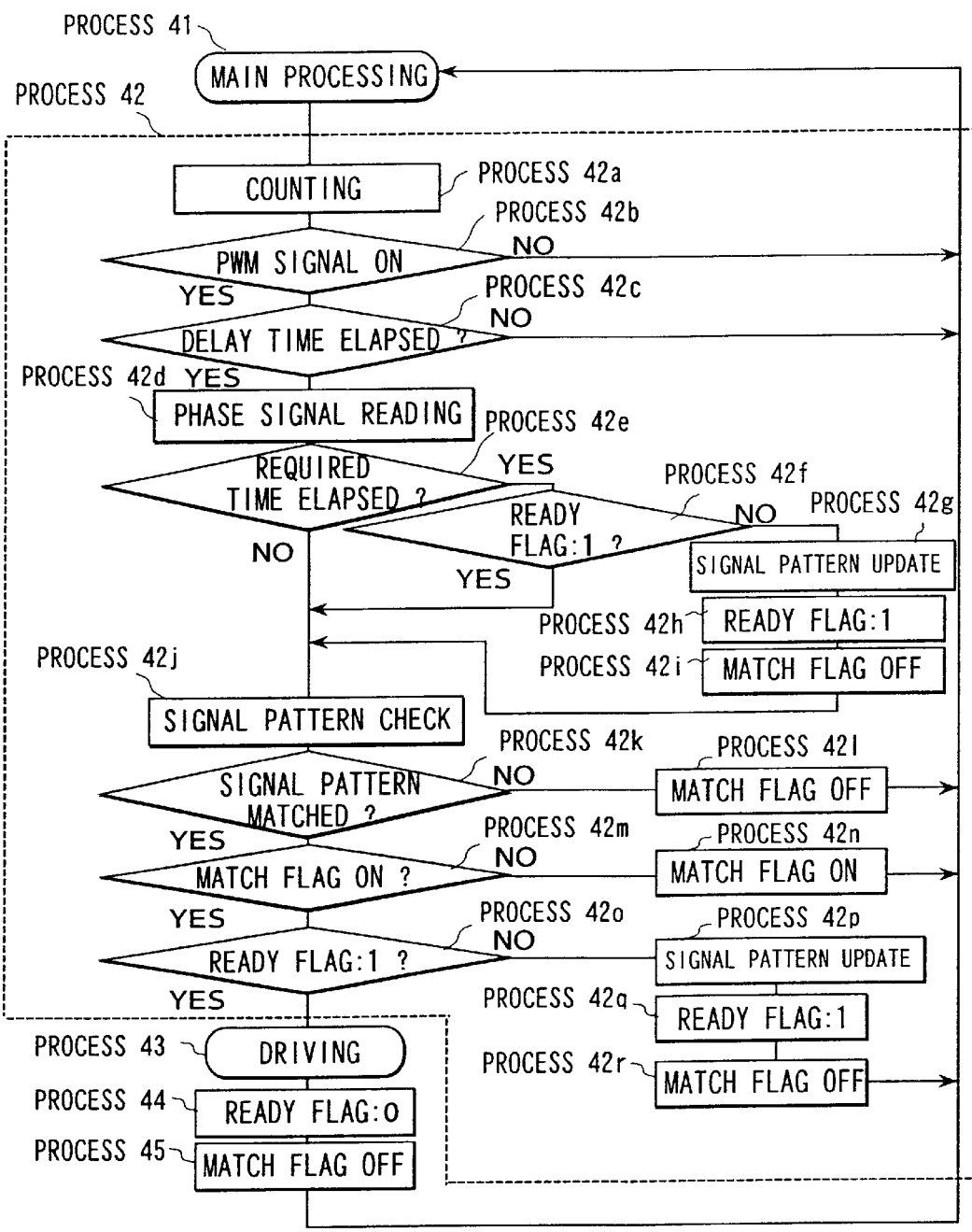
FIG. 4 is a flow chart showing the flow of internal processing by the control circuits in embodiment 1.

An example of internal processing flow in control circuits 6 is shown as FIG. 4. Internal processing by control circuits 6 consists of a main process 41 for generating the speed control signal of the brushless motor 5; a position detection process 42 for detecting the position of the rotor; a driving process 43 for driving inverter circuit 4 in accordance with the speed control signal generated in process. 41 and with the rotor position detected in process 42; a ready flag clearing process 44 for performing the main process 41 after executing the driving process 43; and a match flag clearing process 45.

Driving process 43 enables power-on switching after the elapse of the required time adjusted during phase correction.

Next, process 42 will be described in detail below.

During sub-process "42a", timer "6f" counts how often signal processing has been repeated during the required electrical angle interval (for example, an electrical angle interval of 30 degrees, an electrical angle interval of 60 degrees, an electrical angle interval of 120 degrees, or an electrical angle interval of 360 degrees, or a mechanical angle interval of 360 degrees). Timer "6f" can also manage the elapse of the required time.

During sub-process "42b", data input unit "6i" judges whether the PWM signal 11 generated by PWM signal generation unit "6h" is on or off. This sub-process can be simplified by using a flag or a microcomputer for judging the on/off status of the PWM signal.

During sub-process "42c", data input unit "6i" judges whether a delay time equivalent to the "td" value specified in EEPROM 10 has elapsed. This judgment can be performed by counting with timer "6j" or in sub-process "42a". During this judgment, even if the characteristics of the power module differ, since the internal constants of the software require no modification, versatility can be assigned to the control software by designing the controller so that delay time information can be adjusted using the EEPROM 10, an external resistor, or the like.

During sub-process "42d", data input unit "6i" reads the phase signals "9a" corresponding to phases U, V, and W. At this time, the output of HI level or LOW level signals from control circuits 6 for the purpose of identifying the timing in which the phase signals "9a" have been read is effective for confirming the operation of the controller.

During sub-process "42e", timer "6j" judges whether the required time has elapsed from power-on switching. This judgment can be performed by counting in sub-process "42a".

During sub-process "42f", comparison data storage unit "6d" judges whether the required signal patterns for the next signal processing have been established. If the required patterns have been established, the ready flag is set to '1' by comparison data storage unit "6d", or if the required patterns have not been established, the ready flag is set to '0'.

If the setting of the ready flag is '1' in sub-process "42f", comparison data storage unit "6d" sends the established signal patterns to data comparing unit "6g". If the setting of the ready flag is '0' in sub-process "42f", comparison data storage unit "6d" updates or establishes signal patterns in sub-process "42g" and then, after sending these patterns to data comparing unit "6g", changes the setting of the ready flag to '1'.

During sub-process "42h", comparison data storage unit "6d" clears the match flag used to judge whether the signal patterns have been updated for the first time.

During sub-process "42j", phase detection unit "6e" checks the information signal patterns of the phase signals "9a", which were read during sub-process "42d", against the signal pattern predetermined by the position of the rotor.

If, in sub-process "42k", the signal patterns are found to match, control proceeds to sub-process "42m". If the signal patterns are found to mismatch, control skips to sub-process "42l".

During sub-process "42l", phase detection unit "6e" clears the match flag used to judge whether the signal patterns have matched twice.

During sub-process "42m", phase detection unit "6e" judges whether the signal patterns have matched twice. If the signal patterns have matched and the match flag is off, phase detection unit "6e" turns the match flag back on during sub-process "42n". If the signal patterns have matched and the match flag is on, control proceeds to sub-process "42o".

In sub-process "42o", branching occurs to judge whether the signal patterns required for the next power-on-control processing have been established. If the ready flag is on in sub-process "42o", control proceeds to driving process "43". If the ready flag is off, control proceeds to sub-process "42p".

If the signal patterns required for next power-on control processing are not established (the ready flag is "0") in sub-process "42o", sub-process "42p" is performed to update/establish these signal patterns. In sub-process "42p", phase detection unit "6e" sets the ready flag to '1' to indicate that the required signal patterns have been updated. In sub-process "42r", phase detection unit "6e" clears the match flag used to judge whether the signal patterns have matched for the first time.

After the required signal patterns have been updated in sub-process "42g" or sub-process "42p", when the signal patterns of the phase signals "9a" which were read during sub-process "42d" match, the appropriate power-on pattern for the particular rotating position is determined and driving process "43" is performed.

Since sub-processes "42f" to "42i" and sub-processes "42o" to "42r" are equivalent, subroutining makes it possible not only to minimize increases in program size, but also to control the brushless motor properly even when the reflux current interval that follows power-on switching is very long.

FIG. 5 shows the detected terminal voltages "8a" of the U-, V-, and W-phases of the stator coils in the brushless motor at a current conduction ratio less than 100% during PWM control with upper arm chopping in the inverter 4; the corresponding PWM signals; the comparison result information signals of each phase that are sent from the comparing circuit; the PWM-on information signal patterns read by control circuits 6; and the position detection information recognized inside the control circuits.

When control processing that uses the algorithm shown in FIG. 4 is executed, as seen in FIG. 5, it is resultingly possible not only to prevent mis-judgment, even if, as denoted by "t1" and "t3" in FIG. 5, phase signals equivalent to those of "t2" and "t4" appear immediately after power-on pattern switching, but also to obtain the proper phase signals without suffering any effects of the reflux current flowing immediately after power-on pattern switching, and thus, it is possible to execute power-on switching properly.

Also, after the signal patterns have been updated in sub-processes "42g" and "42p", described with reference to FIG. 4, if the corresponding signals fluctuate near the reference position, as shown in FIG. 3 at waveform(b), these signals will appear as shown in FIG. 3 at waveform (c), and, then, when control is transferred from process "41" to periodic process "42", process "42" will be performed in the timing seen in FIG. 3 at waveform (d). After this, sub-process "42d" will be performed with the timing seen in FIG. 3 at waveform (e). Then, signal pattern checking will occur in sub-process "42j", and, in sub-process "42k", control will advance from pattern match confirmation to sub-process "42m". At this time, since pattern matching is performed for the first time in the present power-on interval and the match flag is off, control will branch from sub-process "42m" into sub-process "42n". Hereafter, sub-process "42d" will be performed once again, but this time, in the "td" timing seen FIG. 3 at waveform(g); and, when sub-process "42j" is performed thereafter, since the signal patterns will not match in sub-process "42k", control will branch into sub-process "42l", where the match flag will then be cleared to return control to process "41".

When control is further transferred from process "41" to periodic process "42", sub-process "42d" will be performed in the "tc" timing seen FIG. 3 at waveform (c); and then, as with the above-mentioned processing sequence, processing will be executed to sub-process "42n", and, during the time interval up to this step, sub-processes "42d" to "42m" will be performed. Since the match flag at this time is on, control will further advance to process 43 through sub-process "42o", and the driving process appropriate for the particular position of the rotor will be performed.

The use of the phase signal generation circuit 9 and position detection algorithm described above enables proper detection of the rotor position . . . even if any pulse-like noise occurs . . . and hence, proper control of the motor is possible. Although this embodiment assumes that, before control can be advanced to the driving process, phase signal "9a" pattern matching must be repeated twice, this embodiment is also valid in any other cases of multiple times of matching. In addition, this embodiment is valid even if pattern matching is omitted by suppressing the noise and/or signal fluctuations appearing as terminal voltages of the stator coils in brushless motor 5.

Figure 6:
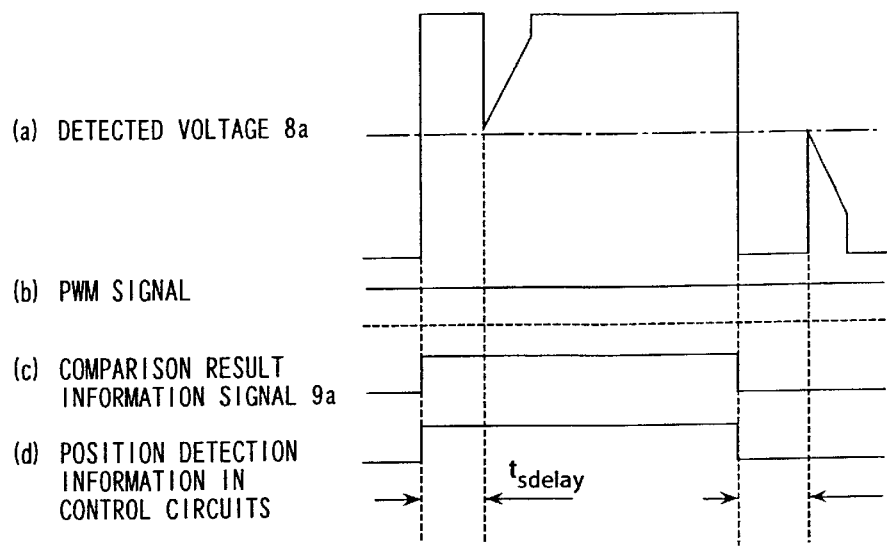
FIG. 6 is a diagram showing the signal waveforms developed when the flow interval of the reflux current that follows power-on switching is very long.

The terminal voltages "8a", that are detected when the interval during which the reflux current flows following power-on pattern switching is very long, the comparison result information signals sent from the comparing circuit, and one phase of the position detection information inside the control circuits are shown in FIG. 6.

When this position detection algorithm is used, since the phase signal generation circuit 9 reads PWM signal-on phase signals, in addition to requiring only a comparator circuit, the same position detection information can be obtained, regardless of whether any choppers are active during PWM control, and thus the motor can be controlled properly, even during PAM control.

In addition, even when, as shown in FIG. 6, the interval during which the reflux current flows following power-on pattern switching is very long and information signal voltages do not change near their reference position, since sub-process "42e" is provided, the signal patterns to be checked are forcibly modified after the elapse of the required time following power-on switching has been confirmed. Thereby, the next power-on switching can be executed without stopping the motor, with the result that the motor can be controlled properly.

Furthermore, in a configuration using an output variable type of rectifying circuit 2, since the reference voltage of the comparing circuit is variable according to the particular output voltage, this embodiment also enables the same position detection information to be obtained from phase signals during either a PWM control full-region/PAM control mode or a PWM/PAM switching control mode, thus enabling the implementation of proper motor control.

Detection errors due to noise can also be reduced since control circuits 6 detect (judge) the rotor position in accordance with the phase signal patterns corresponding to the detected terminal voltages of each phase of the stator coils in specific timing.

In addition, malfunction due to noise can be minimized since control circuits 6 can determine the next power-on pattern from the particular rotor position and the present power-on pattern for the stator coils.

Furthermore, the use of this algorithm enables not only the configuration of the software to be simplified, but also the size of the data table required for microcomputer control and the related occupancy of a RAM or ROM to be minimized since judgment data on the loss of the reflux current and judgment data on position detection can be the same. Accordingly, proper motor control can be achieved using even a small-capacity low-cost microcomputer, and the incorporation of such a controller into an electrical household appliance can guarantee high product quality at a low cost.

Figure 7:
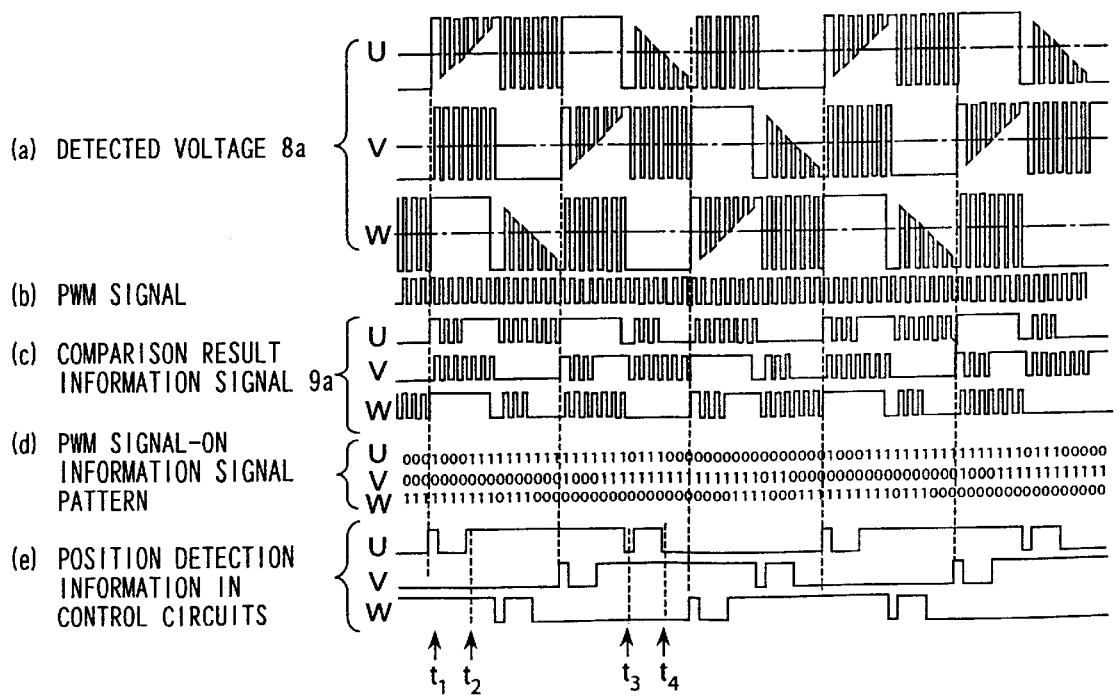
FIG. 7 is a diagram showing the signal waveforms developed when PWM control is performed with the upper, lower, and first-half 60-degree arm choppers combined in the inverter circuit of embodiment 1.

Those voltage detection signals, PWM signals, comparison result information signals, PWM signal-on information signal patterns, and position detection information signal waveforms inside the control circuits, that are developed when PWM control is performed with the upper, lower, and first-half 60-degree arm choppers combined in inverter circuit 4, are shown in FIG. 7.

Similarly, the above-mentioned five items obtained when PWM control is performed with the upper, lower, and second-half 60-degree arm choppers combined in inverter circuit 4, when PWM control is performed with the upper, lower, and second-half 30-degree arm choppers combined in inverter circuit 4, and when PWM control is performed with the upper, lower, and first-half 30-degree arm choppers combined in inverter circuit 4, are shown in FIGS. 8, 9, and 10, respectively.

In all cases, the same position detection information can be obtained from PWM signal-on comparison result information signals.

Irrespective of the chopping scheme applied to PWM control, therefore, proper motor control can be implemented under free combinations of the upper arm chopper, the upper and lower arm choppers, the first-half 60-degree chopper, the second-half 60-degree chopper, the first-half 30-degree chopper, and/or the second-half 30-degree chopper, in inverter 4.

In addition, irrespective of the chopping scheme applied to PWM control, since the position of the rotor in the motor can be properly detected using this position detection method, only the upper or lower switching devices among all six devices do not need to execute chopping, and this enables a motor controller to be constructed using an inexpensive power module that contains devices low in operating speed and in price. As a result, a high-quality motor controller can be realized at a low cost.

Figure 11:
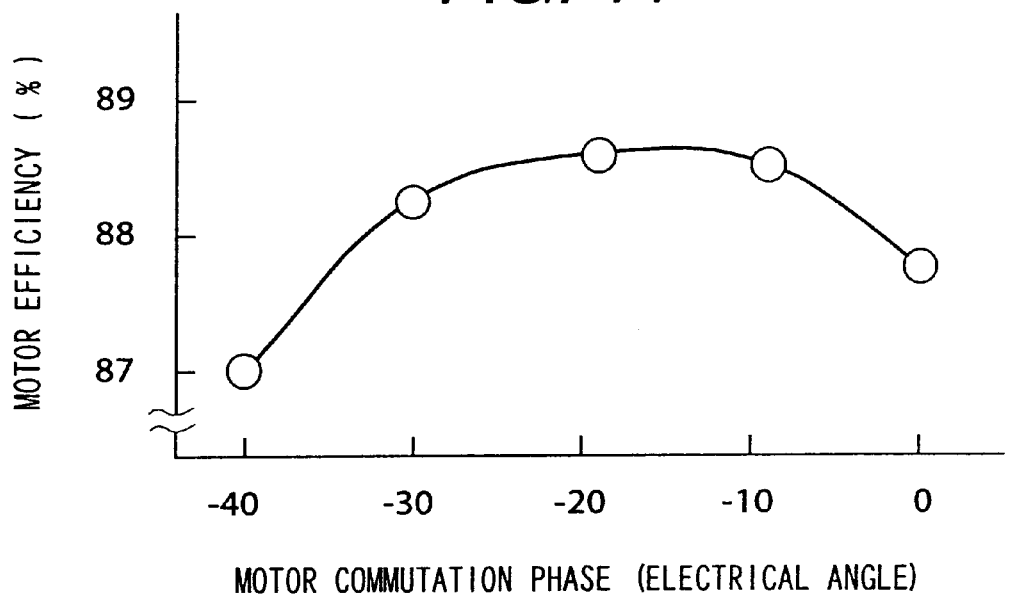
FIG. 11 is a graph showing the operational efficiency of the brushless motor with respect to the power-on phase in embodiment 1.

The operational efficiency of a brushless motor with respect to the power-on phase is shown in FIG. 11. Since the operational efficiency of a brushless motor changes according to the power-on phase with respect to the counter-electromotive force, the power-on phase is a very important factor. To ensure maximum efficiency during the start of the motor, therefore, the brushless motor can be operated with high efficiency by controlling the power-on phase in accordance with RAM- or ROM-prestored information, the rotational speed of the motor, and the information calculated from the amount of current flowing through the inverter circuit or from the amount of motor current.

Also, the brushless motor can be operated at the user side during the motor-fitting power-on phase by enabling external control of the power-on phase. The A/D conversion terminals, communications terminals, or input ports of control circuits 6 can be used as the control terminals for such external control.

Figure 12:
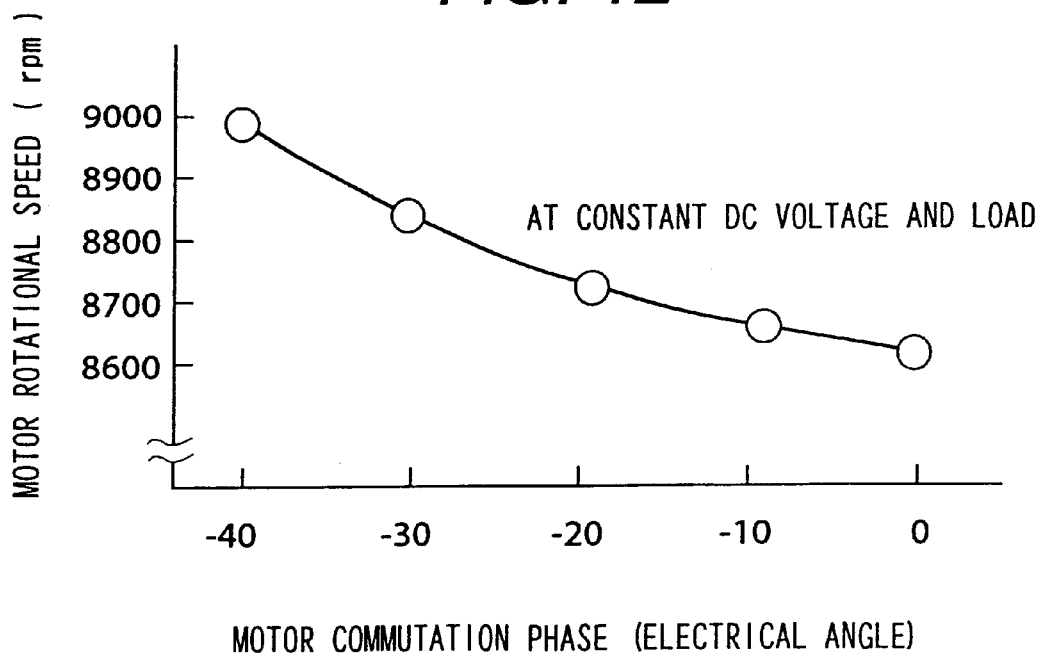
FIG. 12 is a graph showing the speed characteristics of the brushless motor in embodiment 1.

During PWM control, by which the speed of the brushless motor is controlled by controlling the pulse widths of the terminal voltage signals supplied to the stator coils, when the current conduction ratio arrives at its maximum value of 100%, control for a further increased motor speed cannot be provided. During PAM control, by which the motor speed is controlled by controlling the pulse heights of the terminal voltage signals supplied to the stator coils, when the maximum allowable terminal voltage is reached, control for a further increased motor speed cannot be provided. However, as shown in FIG. 12, the motor speed can be varied by changing the power-on phase after maintaining the terminal voltages supplied to the stator coils at the same value. And, this method of power-on phase control can be implemented using phase signals.

The rotational speed of the brushless motor can therefore be controlled over a wide range by performing power-on phase control in addition to the PWM control and PAM control schemes based on the stator coil currents of the motor. For example, when a normal mode of operation is to be maintained, operational control characteristics with importance being attached to efficiency can be obtained by providing power-on phase control for maximum motor efficiency under the status that the maximum allowable current conduction ratio is not reached in PWM control, or under the status that the maximum allowable supply voltage is not reached in PAM control; and, when faster rotation is required, operational control characteristics with importance being attached to speed can be obtained by controlling the power-on phase so as to advance beyond the maximum efficiency point after the maximum allowable current conduction ratio or supply voltage has been reached. This means that, since the operational control characteristics of the brushless motor can be obtained with importance being attached to efficiency or speed, the motor can be controlled over a wide range.

A block diagram of a brushless motor controller using a variable resistor, instead of EEPROM 10 including delay time information, is shown as FIG. 13. When only delay time information is to be stored into EEPROM 10, a simple, low-cost, and high-quality motor controller can be constructed by entering information via a variable resistor or the like.

Such a controller can have a reduced number of components and be easier to operate, by constructing the controller as either a hybrid IC chip composed of control circuits 6 and phase signal generation circuit 9, or an intelligent power module consisting of inverter circuit 4, control circuits 6, driver 7, and phase signal generation circuit 9.

Since the heat pump type of air conditioner changes in conditioning output level according to the particular rotational speed of the compressor, air conditioning can be achieved with high conditioning capabilities by driving the compressor/blower thereof with the brushless motor provided with power-on phase control in addition to PWM control and PAM control, as described heretofore. Such an air conditioner can also be improved to provide an energy-saving type by controlling its operation in normal operational region with importance being attached to efficiency.

Similarly, a refrigerator with excellent refrigerating capabilities can be realized by driving the compressor/blower thereof with a brushless motor that is controlled using this controller.

Likewise, a washing machine having excellent controllability can be realized by rotating the pulsator and spin basket thereof using a brushless motor that is controlled by this controller.

Furthermore, a vacuum cleaner having an excellent vacuum attraction force can be realized by driving the blower of the cleaner with a brushless motor that is controlled using this controller.

Furthermore, the use of the phase signal generation circuit and position detection algorithm covered by the present invention makes it unnecessary to establish a large circuit composition including general-purpose logic circuits, or to use electrolytic capacitors of large capacity. Accordingly, it is possible to implement a compact and inexpensive inverter control circuit by integrating an inverter circuit and a driver circuit, and to realize a compact, inexpensive, and highly controllable air conditioner, refrigerator, washing machine, or vacuum cleaner, by use of such an inverter control circuit in these applications.

According to the present invention, when the first information signal pattern and the third information signal pattern are the same and the second information signal pattern is different from the other two patterns, since a reflux current is generated immediately after commutation and is then decayed, the information signal pattern comparison means compares the first information signal pattern, the second information signal pattern, and the third information signal pattern, and generates a reflux current decay signal. Thus, the loss of the reflux current can be detected. As a result, the position of the rotor can be properly detected immediately after commutation, without providing a rotor position detection inhibition interval, by detecting the loss of the reflux current and then detecting the rotating position of the rotor in accordance with the information signal patterns created by the information signal generation means. Even if the load changes abruptly, the corresponding brushless motor can also be driven with rapid response since no inhibition time interval needs to be calculated.

In addition, since rotor position detection is possible without the chopping pattern of any switching device, the position of the rotor can be detected properly, even if the upper or lower three of six switching devices low operating speed devices and are inexpensive.

According to the present invention, when the first information signal pattern and the third information signal pattern are the same and the second information signal pattern is different from the other two patterns, since a reflux current is generated immediately after commutation and is then decayed, and since the second information signal pattern is the information signal pattern corresponding to the rotor position to be detected, the position of the rotor can be properly detected immediately after commutation, without providing a rotor position detection inhibition interval, by detecting from all information signal patterns generated by the information signal generation means, only the information signal pattern which matches the second information signal pattern stored within the information signal pattern storage means, and then by detecting the rotating position of the rotor in accordance with that detected information signal pattern.

According to the present invention, when detection of the loss of the reflux current is followed by matching between the fourth information signal pattern and either of the information signal patterns stored within the information signal pattern storage means, since the fourth information signal pattern is the information signal pattern corresponding to the rotor position to be detected, the information signal pattern comparison means compares the fourth information signal pattern and all other information signal patterns stored within the information signal pattern storage means and generates an information signal pattern match signal. Thereby, the rotating position detection means can properly detect the position of the rotor immediately after commutation, without providing a rotor position detection inhibition interval, by detecting the rotating position of the rotor in accordance with the information signal pattern match signal and the corresponding information signal pattern generated by the information signal generation means.

According to the present invention, even if the reflux current interval that follows power-on switching is too long for the loss of the reflux current to be detected, the magnetic pole position of the rotor can be detected and the motor can be properly controlled at a low cost.

According to the present invention, it is possible not only to detect the position of the rotor in a brushless motor immediately after power-on switching, but also to detect the magnetic pole position of the rotor, even if the reflux current interval that follows power-on switching is very long, and thus the motor can be controlled at a low cost and with high accuracy. In addition, position detection errors and power-on malfunction due to noise can be minimized and the control range can be expanded. Furthermore, the brushless motor can be controlled over a wide range since motor operation can be controlled with importance being attached to efficiency or speed.

And, a high-performance air conditioner, refrigerator, washing machine, or vacuum cleaner can be realized by using a brushless motor controlled by the controller described heretofore.

The use of comparator signals enables highly accurate motor control to be achieved in a PWM control full-region mode, PAM control mode and a PWM/PAM switching control mode, by updating position detection signal patterns after the PWM signal-on reflux current following power-on switching has been lost, and then checking the new position detection signal patterns against the information within the control circuits. Also, an air conditioner, refrigerator, washing machine, or vacuum cleaner having excellent controllability can be realized by providing these appliances with a motor controlled by this motor controller, as their drives.

As described above, the brushless motor controller covered by the present invention, and appliances using this controller, can be used to control the rotational speed of a brushless motor to a desired speed. This controller is therefore suitable for use in an air conditioner that conditions interior air by controlling its internal compressor/blower driving brushless motor using the controller; a refrigerator that provides refrigeration by controlling its internal compressor/blower driving brushless motor using the controller; a washing machine that washes clothes by controlling its pulsator or spin-basket driving brushless motor using the controller; and a vacuum cleaner that cleans rooms by controlling its blower driving brushless motor using the controller.

What is claimed is:

1. A brushless motor controller having an information signal generation means for generating the information signal patterns corresponding to the terminal voltages of the stator coils of multiple phases in a brushless motor, a rotating position detection means for detecting the rotating position of the rotor in said brushless motor in accordance with said information signal patterns, and a power-on control unit for supplying power to said stator coils in accordance with said rotating position, wherein said controller is characterized in that it further has an information signal pattern storage means for storing said information signal patterns, and an information signal pattern comparison means by which the first information signal pattern stored within said information signal pattern storage means, the second information signal pattern generated immediately after commutation, and the third information signal pattern generated after the elapse of the required time immediately following said commutation are compared and when said first information signal pattern and said third information signal pattern are the same and said second information signal pattern is different from said first information signal pattern and said third information signal pattern, a reflux current decay signal is generated to indicate that the reflux current has been decayed.

2. Such brushless motor controller as set forth in claim 1 above, wherein said controller is characterized in that it further has an information signal pattern changing means by which said first information signal pattern stored within said information signal pattern storage means is changed to said second information signal pattern in accordance with said reflux current decay signal.

3. Such brushless motor controller as set forth in claim 1 above, wherein said motor controller is characterized in that when matching is established between the stored information signal pattern within said information signal pattern storage means and the fourth information signal pattern generated after the required time elapsed from the occurrence of said third information signal pattern, said information signal pattern changing means generates an information signal pattern match signal, and in that said rotating position detection means detects the rotating position of the rotor in accordance with said information signal pattern match signal.

4. Such brushless motor controller as set forth in claim 2 above, wherein said information signal pattern changing means is characterized in that when the required time elapses from commutation, said first information signal pattern stored within said information signal pattern storage means is changed to said second information signal pattern.

5. A brushless DC motor controller having a voltage detection means capable of generating the detected voltage values corresponding to the terminal voltages of the stator coils of multiple phases in a brushless motor, a reference voltage generation means for generating a reference voltage, a comparison means capable of generating a comparison result information signal after comparing said detected voltages and reference voltage, and a control means for detecting the rotating position of the rotor in the brushless motor in accordance with the foregoing comparison result information signal and then sending the appropriate power-on signal to said stator coils according to the detected rotating position, wherein said brushless DC motor controller is characterized in that said control means detects the rotor position immediately after power-on switching for said stator coils without an inhibition time interval being provided.

6. A brushless DC motor controller having a rectifying circuit for transforming an AC supply voltage into a DC voltage, an inverter circuit for converting said DC voltage into an AC voltage and supplying this AC voltage to a brushless motor, and control circuits for controlling the inverter circuit, wherein said brushless DC motor controller is characterized in that it further has a voltage detection means capable of generating the detected voltage values corresponding to the terminal voltages of the stator coils of multiple phases in said brushless motor, a reference voltage generation means for generating a reference voltage, a comparison means capable of generating a comparison result information signal after comparing said detected voltages and reference voltage, and a control means for detecting the rotating position of the rotor in the brushless motor in accordance with the foregoing comparison result information signal and then sending the appropriate power-on signal to said stator coils according to the detected rotating position, and in that said control means detects the rotor position immediately after power-on switching for said stator coils without an inhibition time interval being provided.

7. A brushless DC motor controller having converter circuits composed of a rectifying circuit for transforming an AC supply voltage into a DC voltage and a chopper circuit for controlling the magnitude of said DC voltage, an inverter circuit for receiving an DC voltage from said converter circuits and then after converting this voltage into an AC voltage, supplying this AC voltage to a brushless motor, a converter control circuit for controlling the switching operation of said chopper circuit, an inverter control circuit for controlling the switching operation of said inverter circuit and driving the brushless motor, and control circuits for controlling said converter control circuit and inverter control circuit, wherein said brushless DC motor controller is characterized in that it further has a voltage detection means capable of generating the detected voltage values corresponding to the terminal voltages of the stator coils of multiple phases in said brushless motor, a reference voltage generation means for generating a reference voltage, a comparison means capable of generating a comparison result information signal after comparing said detected voltages and reference voltage, and a control means for detecting the rotating position of the rotor in the brushless motor in accordance with the foregoing comparison result information signal and then sending the appropriate power-on signal to said stator coils according to the detected rotating position, and in that said control means detects the rotor position immediately after power-on switching for said stator coils without an inhibition time interval being provided.

8. A brushless motor controller having a voltage detection means capable of generating the detected voltage values corresponding to the terminal voltages of the stator coils of multiple phases in a brushless motor, a reference voltage generation means for generating a reference voltage, a comparison means capable of generating a comparison result information signal after comparing said detected voltages and reference voltage, a control means for detecting the rotating position of the rotor in the brushless motor in accordance with the foregoing comparison result information signal and then sending the appropriate power-on signal to said stator coils according to the detected rotating position, and an output means for using the above-mentioned power-on signal to supply power to said stator coils, wherein said brushless motor controller is characterized in that said control means detects the rotor position in accordance with the comparison result information signal patterns of multiple phases.

9. A brushless motor controller having a voltage detection means capable of generating the detected voltage values corresponding to the terminal voltages of the stator coils of multiple phases in a brushless motor, a reference voltage generation means for generating a reference voltage, a comparison means capable of generating a comparison result information signal after comparing said detected voltages and reference voltage, a control means for detecting the rotating position of the rotor in the brushless motor in accordance with the comparison result information signal received from said comparison means and generating a power-on signal, and an output means for using this power-on signal to supply power to said stator coils, wherein said brushless motor controller is characterized in that said control means determines the power-on pattern for said stator coils in accordance with the comparison result information signal patterns of multiple phases.

10. A brushless motor controller having a voltage detection means capable of generating the detected voltage values corresponding to the terminal voltages of the stator coils of multiple phases in a brushless motor, a reference voltage generation means for generating a reference voltage, a comparison means capable of generating a comparison result information signal after comparing said detected voltages and reference voltage, a control means for detecting the rotating position of the rotor in the brushless motor in accordance with the above-mentioned comparison result information signal and sending the appropriate power-on signal to the stator coils according to the detected rotor position, and an output means for using the above-mentioned power-on signal to supply power to said stator coils, wherein said brushless motor controller is characterized in that said control means uses said comparison result information signal patterns to detect the interval during which the reflux current that follows power-on switching is flowing.

11. A brushless motor controller having a voltage detection means capable of generating the detected voltage values corresponding to the terminal voltages of the stator coils of multiple phases in a brushless motor, a reference voltage generation means for generating a reference voltage, a comparison means capable of generating a comparison result information signal after comparing said detected voltages and reference voltage, a control means for obtaining phase signals in accordance with the above-mentioned comparison result information signal and then after detecting the position of the rotor in accordance with the obtained phase signals, generating the appropriate power-on signal, and an output means for using the above-mentioned power-on signal to supply power to said stator coils, wherein said brushless motor controller is characterized in that the phase signal patterns to be checked for position detection are updated after the loss of the reflux current which follows power-on switching.

12. A brushless motor controller having a voltage detection means capable of generating the detected voltage values corresponding to the terminal voltages of the stator coils of multiple phases in a brushless motor, a reference voltage generation means for generating a reference voltage, a comparison means capable of generating a comparison result information signal after comparing said detected voltages and reference voltage, a control means for detecting the rotating position of the rotor in the brushless motor in accordance with the above-mentioned comparison result information signal and sending the appropriate power-on signal to the stator coils according to the detected rotor position, and an output means for using the above-mentioned power-on signal to supply power to said stator coils, wherein said brushless motor controller is characterized in that after the elapse of the required time from power-on switching, said control means updates the phase signal patterns to be checked for position detection.

13. A brushless motor controller having a voltage detection means capable of generating the detected voltage values corresponding to the terminal voltages of the stator coils of multiple phases in a brushless motor, a reference voltage generation means for generating a reference voltage, a comparison means capable of generating a comparison result information signal after comparing said detected voltages and reference voltage, a control means for detecting the rotating position of the rotor in the brushless motor in accordance with the above-mentioned comparison result information signal and sending the appropriate power-on signal to the stator coils according to the detected rotor position, and an output means for using the above-mentioned power-on signal to supply power to said stator coils, wherein said brushless motor controller is characterized in that delay time information on transfer from said control means to the brushless motor is stored into an updatable ROM by said control means.

14. A brushless motor controller having a voltage detection means capable of generating the detected voltage values corresponding to the terminal voltages of the stator coils of multiple phases in a brushless motor, a reference voltage generation means for generating a reference voltage, a comparison means capable of generating a comparison result information signal after comparing said detected voltages and reference voltage, a control means for detecting the rotating position of the rotor in the brushless motor in accordance with the above-mentioned comparison result information signal and sending the appropriate power-on signal to the stator coils according to the detected rotor position, and an output means for using the above-mentioned power-on signal to supply power to said stator coils, wherein said brushless motor controller is characterized in that said control means is constructed so that delay time information on transfer from said control means to the brushless motor will be supplied via a variable resistor.

15. A brushless motor controller having a voltage detection means capable of generating the detected voltage values corresponding to the terminal voltages of the stator coils of multiple phases in a brushless motor, a reference voltage generation means for generating a reference voltage, a comparison means capable of generating a comparison result information signal after comparing said detected voltages and reference voltage, a control means for detecting the rotating position of the rotor in the brushless motor in accordance with the above-mentioned comparison result information signal and sending the appropriate power-on signal to the stator coils according to the detected rotor position, and an output means for using the above-mentioned power-on signal to supply power to said stator coils, wherein said brushless motor controller is characterized in that said control means detects the position of the rotor in accordance with said comparison result information signal patterns and switches the power-on phase in accordance with memory-stored power-on phase information.

16. A brushless motor controller having a voltage detection means capable of generating the detected voltage values corresponding to the terminal voltages of the stator coils of multiple phases in a brushless motor, a reference voltage generation means for generating a reference voltage, a comparison means capable of generating a comparison result information signal after comparing said detected voltages and reference voltage, a control means for detecting the rotating position of the rotor in the brushless motor in accordance with the above-mentioned comparison result information signal and sending the appropriate power-on signal to the stator coils according to the detected rotor position, and an output means for using the above-mentioned power-on signal to supply power to said stator coils, wherein said brushless motor controller is characterized in that said control means detects the position of the rotor in accordance with said comparison result information signal patterns and switches the power-on phase in accordance with external phase control commands.

17. Such brushless motor controller as set forth in claim 10 above, wherein said motor controller is characterized in that it uses either A/D conversion terminals, communications terminals, or input ports, as the input terminals for receiving external phase control commands.

18. A brushless motor controller having a voltage detection means capable of generating the detected voltage values corresponding to the terminal voltages of the stator coils of multiple phases in a brushless motor, a reference voltage generation means for generating a reference voltage, a comparison means capable of generating a comparison result information signal after comparing said detected voltages and reference voltage, a control means for detecting the rotating position of the rotor in the brushless motor in accordance with the above-mentioned comparison result information signal and sending the appropriate power-on signal to the stator coils according to the detected rotor position, and an output means for using the above-mentioned power-on signal to supply power to said stator coils, wherein said brushless motor controller is characterized in that said control means performs phase control in a PWM control region with importance being attached to operational efficiency and performs power-on phase advancement control in the control region with importance being attached to high-speed rotation.

19. Such brushless motor controller as set forth in either claim from 5 to 10 above, wherein said control means is characterized in that it is composed of a microcomputer having a plurality of input/output ports.

20. Such brushless motor controller as set forth in either claim from 5 to 18 above, wherein said control means is characterized in that it is composed of a microcomputer capable of judging at least whether the PWM signal is on or off.

21. Such brushless motor controller as set forth in either claim from 5 to 18 above, wherein said control means is characterized in that it is composed of a hybrid IC having a plurality of input/output ports.

22. Such brushless motor controller as set forth in either claim from 5 to 18 above, wherein said control means is characterized in that it is composed of a hybrid IC capable of judging at least whether the PWM signal is on or off.

23. Such brushless motor controller as set forth in either claim from 5 to 22 above, wherein said control means is characterized in that it sends signals in almost the same timing as said phase signals are read.

24. An air conditioner characterized in that it is constructed using a compressor and blower driven by a brushless motor whose operation is controlled by such brushless motor controller as set forth in either claim from 5 to 22 above.

25. A refrigerator characterized in that it is constructed using a compressor and blower driven by a brushless motor whose operation is controlled by such brushless motor controller as set forth in either claim from 5 to 22 above.

26. A washing machine characterized in that it is constructed using as its drive a brushless motor whose operation is controlled by such brushless motor controller as set forth in either claim from 5 to 22 above.

27. A vacuum cleaner characterized in that it is constructed using as its drive a brushless motor whose operation is controlled by such brushless motor controller as set forth in either claim from 5 to 22 above.

* * * * *